United States Patent
Wright

[11] 3,937,295
[45] Feb. 10, 1976

[54] BRAKE CONTROL APPARATUS FOR AUTOMATICALLY ENGAGING AND DISENGAGING THE PARK BRAKES OF A VEHICLE

[76] Inventor: Virgil Wright, Rte. 3, Huntsville, Ark. 72740

[22] Filed: Mar. 11, 1974

[21] Appl. No.: 449,630

[52] U.S. Cl. ..... 180/103 BF; 74/89.15; 74/424.8 R; 180/82 B; 188/10
[51] Int. Cl.² ........................................ B60T 7/12
[58] Field of Search ............... 180/82 B, 82 R, 103; 74/89.15, 424.8 R; 188/10

[56] References Cited
UNITED STATES PATENTS

| | | | |
|---|---|---|---|
| 2,734,590 | 2/1956 | Hays, Jr. | 188/110 X |
| 2,951,460 | 9/1960 | Pierson | 74/89.15 X |
| 3,546,930 | 12/1970 | Flarsheim | 74/89.15 |
| 3,593,815 | 7/1971 | Inouc | 180/82 B |
| 3,640,138 | 2/1972 | Hahn | 74/89.15 |
| 3,831,703 | 8/1974 | Fontaine | 180/82 B X |

*Primary Examiner*—M. Henson Wood, Jr.
*Assistant Examiner*—John P. Silverstrim
*Attorney, Agent, or Firm*—Dunlap, Codding & McCarthy

[57] ABSTRACT

An improved brake control apparatus automatically engaging the park brakes of a vehicle when the vehicle ignition switch is turned to the off position and automatically disengaging the park brakes of a vehicle when the vehicle ignition switch is turned to the on position. The brake control apparatus is constructed to be utilized in cooperation with an automobile park brakes and with the park brakes of a trailer or the like, for example, the brake control apparatus being installable as an accessory item or as original equipment.

9 Claims, 2 Drawing Figures

BRAKE CONTROL APPARATUS FOR AUTOMATICALLY ENGAGING AND DISENGAGING THE PARK BRAKES OF A VEHICLE

BACKGROUND OF THE INVENTION

1. Field of the Invention

The present invention relates generally to vehicle brake control systems and, more particularly, but not by way of limitation, to a brake control apparatus selectively engaging and disengaging the vehicle park brakes in response to the positioning of the vehicle ignition switch.

2. Brief Description of the Prior Art

Various safety systems and the like associated with automobile or vehicle brake systems have been proposed in the past and some of these past systems have been connected to the vehicle ignition switch. For example, the U.S. Pat. Nos. 2,499,276, issued to Mullins; and 2,585,206, issued to Zentecki, each disclosed a safety system wherein the engaged and disengaged position of the vehicle brakes was controlled via the vehicle ignition circuit. The U.S. Pat. No. 3,545,126, issued to Nash, disclosed a system wherein the vehicle hand brake was set when the vehicle ignition was turned to the "off" position, a hand brake applying spring being released in the off position of the vehicle ignition switch. The U.S. Pat. No. 3,593,815, issued to Inoue disclosed a system for automatically actuating and deactuating a parking brake in response to signals connected to a logic unit which generates a control signal connected to a brake controller circuit. The U.S. Pat. No. 2,813,603, issued to Balass disclosed a system wherein the vehicle wheel brakes were applied when a brake operating member was operated, the brake operating member being connected to the master cylinder. The U.S. Pat. No. 1,951,189, disclosed a system automatically setting the brakes and turning the ignition switch to the off position in the event the vehicle driver or operator becomes unable to operate the vehicle. The U.S. Pat. No. 3,370,671, issued to Stortz disclosed a locking mechanism preventing movement of the transmission selector lever from the park position when the vehicle engine was not running, the system preventing movement of the parking brake release lever in one disclosed form.

SUMMARY OF THE INVENTION

An object of the present invention is to provide an improved brake control apparatus for assuring the vehicle brakes are engaged in the off position of the vehicle ignition switch and disengaged in the on position of the vehicle ignition switch in a more efficient and more economical manner.

Another object of the invention is to provide a vehicle safety system for automatically engaging and disengaging the vehicle park brakes in a more efficient and more economical manner.

One other object of the invention is to provide an improved brake control apparatus which can be conveniently and economically installed on existing vehicles and included as original equipment.

Other objects and advantages of the invention will be evident from the following detailed description when read in conjunction with the accompanying drawings which illustrate one preferred embodiment of the invention.

DESCRIPTION OF THE PREFERRED EMBODIMENT

Figure 1:
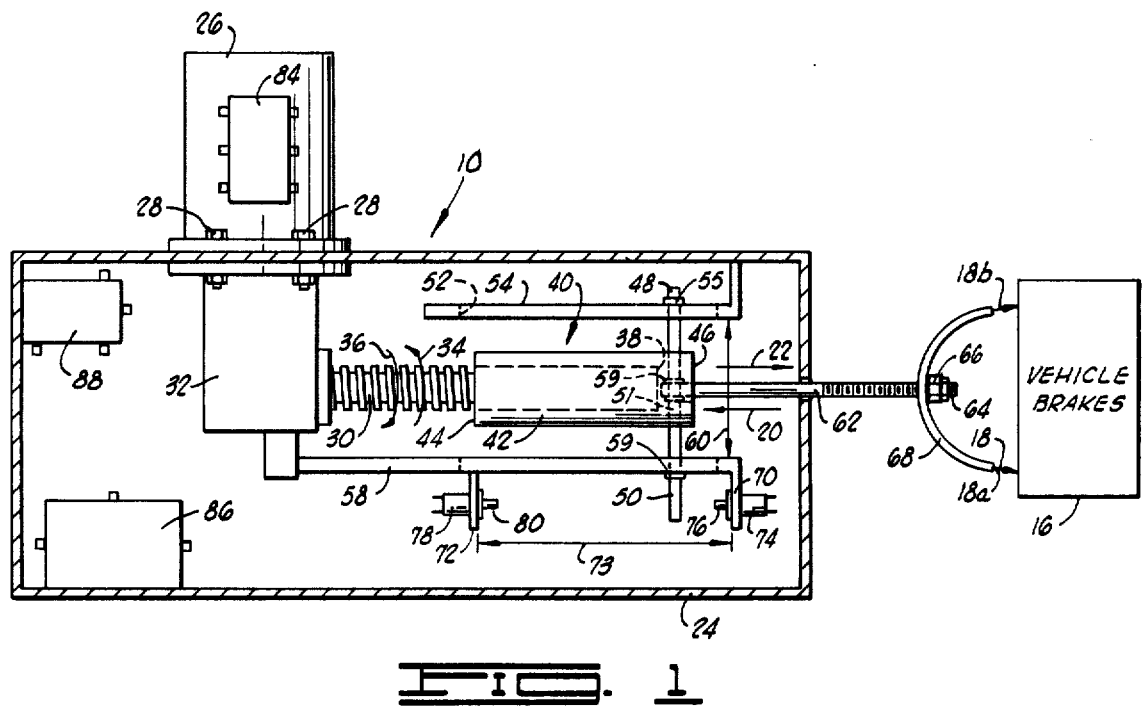
FIG. 1 is a partial diagrammatic, partial elevation, partial schematic view of a brake control apparatus constructed in accordance with the present invention.

Referring to the drawings in general and to FIG. 1 in particular, shown therein and designated via the general reference numeral 10 is a brake control apparatus constructed in accordance with the present invention. The brake control apparatus 10 is constructed to be installed as an accessory operating in cooperation with the existing park brakes of a wheeled vehicle such as an automobile or a trailer or the like or, in one other preferred form, to be installed as original equipment of such wheeled vehicles. The brake control apparatus 10 is connected to the vehicle ignition switch 12 and the vehicle power supply 14, i.e., the vehicle twelve volt DC battery, for example, a portion of the brake control apparatus 10 being connected to the vehicle brakes (diagrammatically shown in FIG. 1 and designated via the general reference numeral 16) via a brake cable 18. The brake control apparatus 10 automatically engages and disengages the vehicle brakes 16 in response to the positioning of the vehicle ignition switch 12 to assure the vehicle brakes 16 are engaged in the off position of the vehicle ignition switch 12 and are disengaged in the on position of the vehicle ignition switch 12.

The vehicle brakes 16 are, more particularly, the emergency or park brakes of the vehicle and the brake cable 18 includes brake cable portions 18a and 18b, each being connected to the parking brake lever on one of the vehicle wheel brakes in the usual manner for connecting the parking brake cables to the vehicle wheel brakes. In this form, the movement of the brake cable 18 in a brake engaging direction 20 moves the parking brake lever in a manner causing the vehicle brake shoe to be pressed against the vehicle brake drum engaging the vehicle wheel brakes and the movement of the brake cable 18 in a brake disengaging direction 22 moves the parking brake lever in a manner causing the vehicle brake shoe to be released from pressing engagement against the vehicle brake drum disengaging the vehicle wheel brakes. Vehicle brakes having brake cables connected to the parking brake levers located on the vehicle brakes are well known in the art and a detailed description of the construction of such vehicle brakes and the connection of the brake cables 18 thereto for operating the parking brake lever (sometimes referred to in the art as a "brake arm") is not deemed necessary.

In one other preferred form, the brake control apparatus 10 can be connected directly to the parking brake pedal lever usually located inside the vehicle and on the driver's side, the parking brake pedal being connected to the parking brake lever on the vehicle wheel brakes via brake cables. The parking brake pedal lever is mounted for pivotal movement and is connected to the parking brake levers such that the vehicle operator can engage the vehicle brakes by depressing the parking brake pedal lever pivotally moving the parking brake pedal lever in one direction. The parking brake pedal lever is usually held in a depressed position engaging the vehicle wheel brakes via a ratchet arrangement or some other similar holding mechanism which can be manually released allowing the parking brake pedal lever to be pivotally moved in one other direction disengaging the vehicle brakes. In this form, the portion of the brake control apparatus 10 connected to the brake cable 18 is connected directly to the parking brake pedal lever pivotally moving the parking brake pedal lever in a direction engaging the vehicle brakes 16 and pivotally moving the parking brake pedal lever in a direction disengaging the vehicle brakes 16. In this operational embodiment of the invention, the parking brake pedal lever is connected to the vehicle brakes 16 via the brake cables and the brake control apparatus 10 thus is connected to the vehicle brakes 16 via the parking braking pedal lever.

In one other preferred operational embodiment of the present invention, the portion of the brake control apparatus 10 connected to the brake cable 18 is directly connected to the emergency or parking brake linkage which is connected to the emergency brake bell on the rearward end portion of the vehicle transmission, the vehicle emergency brake bell being located with the emergency brake shoes on the end of the vehicle drive shaft, opposite the end connected to the vehicle wheels. This form of emergency or parking brake system is commonly utilized in truck type wheeled vehicles, for example. The brake control apparatus 10 operates to engage and disengage the vehicle brakes 16 by operating the emergency or parking brake linkage in a manner similar to that described before with respect to the parking brake pedal lever.

As mentioned generally before, the brake control apparatus 10 can be connected to the vehicle brakes 16 of an automobile or a trailer. In one preferred embodiment, the brake control apparatus 10 is connected to the trailer vehicle brakes or to the trailer vehicle brakes and the automobile vehicle brakes, the brake control apparatus 10 simultaneously engaging and disengaging the automobile and the trailer vehicle brakes, in the last-mentioned operational embodiment. In either event, when the brake control apparatus 10 is utilized to engage and disengage the vehicle brakes of the towed trailer type vehicle, the brake control apparatus 10 is wired through the automobile vehicle ignition switch 12 in a manner exactly as if the brake control apparatus 10 were being utilized to operate the automobile vehicle brakes. Thus, the brake control apparatus 10 operating the trailer brakes utilizes the battery power supply of the automobile which is particularly desirable in some applications where the trailer does not include a separate power supply. It should be noted that, when the automobile vehicle ignition switch 12 is turned to the off position, the trailer vehicle brakes will be engaged thereby assuring the trailer vehicle brakes are engaged prior to disconnecting the trailer from the automobile assuming the operator turns the vehicle ignition switch to the off position prior to disconnecting the trailer from the vehicle. In one other form, an override switch can be connected in parallel with the vehicle ignition switch and the override switch can be connected to the trailer hitching mechanism to assure the trailer vehicle brakes are engaged prior to unhitching the trailer from the automobile.

The brake control apparatus 10 operates to automatically engage and disengage the vehicle brakes 16 in response to the positioning of the vehicle ignition switch 12 in the off and the on positions, in a manner to be described in detail below. It is to be specifically understood that the term "vehicle brakes" as utilized herein and the diagrammatic showing of the vehicle brakes 16 in FIGS. 1 and 2 encompasses and refers to the various operational embodiments described above, the brake cable 18 being shown in the drawings and referred to below for the purpose of clarity and it being further understood that the brake cable 18 is not directly connected to the portion of the brake control apparatus 10 as shown in the drawings in some of the operational embodiments of the present invention as described before.

Figure 2:
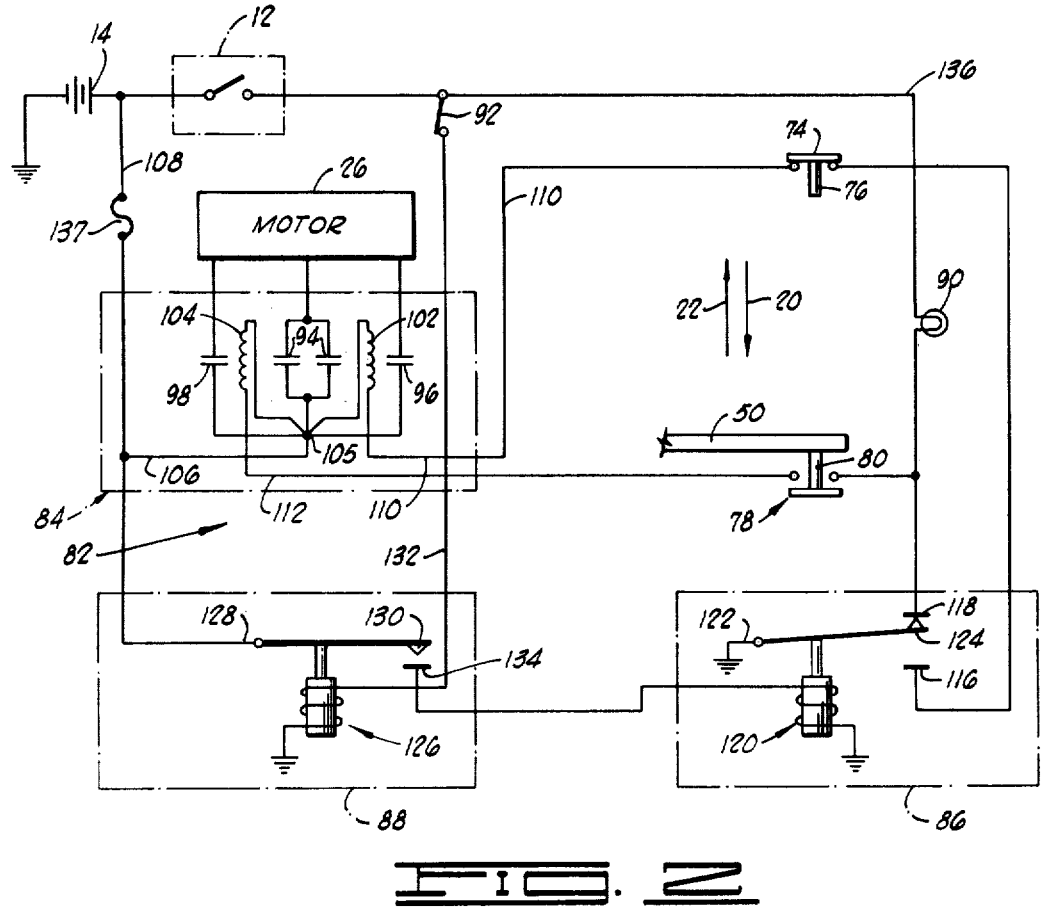
FIG. 2 is a schematic view showing the electrical control circuits of the brake control apparatus of FIG. 1.

Referring more specifically to the brake control apparatus 10, as shown in FIGS. 1 and 2, includes a housing 24 adapted to be bolted or otherwise securedly affixed to a portion of the vehicle frame (not shown) and constructed to housingly support in operating positions some of the components and assemblies of the brake control apparatus 10. A motor 26 is secured to the housing 24 via bolts 28 and, in a preferred form, the motor 26 is a twelve volt reversible motor having an off condition, an actuated forward condition and an actuated reverse condition. The motor 26 has an output drive shaft (not shown in the drawings) and rotatingly drives the output shaft in one direction of rotation in the actuated forward condition thereof, the motor 26 rotatingly driving the output shaft in the opposite direction of rotation in the actuated reverse condition thereof. Reversible motors constructed to rotatingly drive output shafts in opposite directions of rotation are well known in the art and commercially available.

The motor 26 drive shaft is connected to a threaded rod 30 via a reduction gear 32. The motor 26 thus rotatingly drives the rod 30 in a first direction of rotation 34 in the actuated forward condition of the motor 26 and the motor 26 rotatingly drives the rod 30 in a second direction of rotation 36 in the actuated reverse condition of the motor 26. The rod 30 is rotatingly driven via the motor 26 in the first and the second directions of rotation 34 and 36 at a reduced rotational rate of speed as compared to the rotational rate of speed of the motor 26 output drive shaft.

The end of the threaded rod 30, opposite the end connected to the motor 26, is threadedly disposed through a threaded opening 38 formed through a portion of a slide member 40. The slide member 40 includes a cylindrically shaped tube 42 having opposite ends 44 and 46, the threaded opening 38 being formed through a central portion of the tube 42 and extending a predetermined distance therethrough intersecting the end 44 thereof forming what is sometimes referred to herein as the open end 44. The rod 30 is thus threadedly connected to the slide member 40 or, more particularly, the tube 42, the rod 30 and the tube 42 being constructed such that the tube 42 is moved in the brake engaging direction 20 when the rod 30 is rotated in the first direction of rotation 34 and such that the tube 42 is moved in the brake disengaging direction 22 when the rod 30 is rotated in the second direction of rotation 36.

The slide member 40 includes a pair of cylindrically shaped guide arms 48 and 50. One end of each of the guide arms 48 and 50 extends a distance radially from the tube 40, the guide arms 48 and 50 being oriented approximately one-hundred and eighty degrees (180°) apart.

The guide arm 48 extends from the tube 48 and a portion of the guide arm 48, generally opposite the end portion thereof connected to the tube 48, is slidingly and movably disposed through an elongated guide slot 52 formed through a guide rail 54 and extending a predetermined distance generally between the opposite ends of the guide rail 54. The guide arm 48 is retained in an assembled postion within the guide slot 52 via a retainer 55 secured to the guide arm 48 and engaging a portion of the guide rail 54 to prevent the guide arm 48 from being withdrawn through the guide slot 52. The guide arm 50 extends from the tube 48 and a portion of the guide arm 50, generally opposite the end portion thereof connected to the tube 40, is slidingly and movably disposed through an elongated guide slot 56 formed through a guide rail 58 and extending a predetermined distance generally between the opposite ends of the guide rail 58. The guide arm 50 is retained in an assembled position within the guide slot 56 via a retainer 59 secured to the guide arm 50 and engaging a portion of the guide rail 58 to prevent the guide arm 50 from being withdrawn through the guide slot 56.

Each of the guide rails 54 and 58 is secured to the housing 24 and spaced a predetermined distance 60 apart, the guide rail 54 extending along the housing 24 generally parallel to guide rail 58. The guide rails 54 and 58 are thus slidingly connected to the slide member 40 via the guide arms 48 and 50, and the guide rails 54 and 58 cooperate to slidingly support the slide member 40, or, more particularly, the tube 42 for sliding movement in the brake engaging direction 20 and for sliding movement in the brake disengaging direction 22 during the operation of the brake control apparatus 10.

One end of a cylindrically shaped, elongated connector 62 is secured to the end 46 of the tube 42 and the connector 62 extends a distance from the end 46 terminating with a threaded end portion 64. In one preferred form shown in FIG. 1, the guide arms 48 and 50 are constructed of a single, one-piece rod 51 which is disposed through openings in the tube 42 and positioned as described before to provide the two extending guide arms 48 and 50 portions. In this form, one end of the connector 62 extends through the end of the tube 42 and the rod 51 extends through an opening in the end of the connector 62, the rod 51 being secured to the connector 62 via retainers 53 thereby securing the connector 62 to the end of the tube 42.

An adjusting nut 66 is threadedly disposed on the threaded end portion 64 of the connector 62. A portion of the brake cable 18 is disposed through a hollow opening extending through a flexible hose 68 and the hose 68 is securely affixed to the threaded end portion 64 of the connector 62, a portion of the hose 68 engaging the adjusting nut 66. The adjusting nut 66 thus positions the hose 68 and the brake cable 18 extending therethrough on the connector 62 in an adjustable manner so the tension of the brake cable 18 extending between the brake control apparatus 10 and the vehicle brakes 16, or, in some applications, providing what may be referred to as an adjustable length brake cable since the distance over which the brake cable 18 must extend between the brake control apparatus 10 and the vehicle brakes 16 is adjustable by adjusting the connection between the brake cable 18 and the connector 62 via positioning the adjusting nut 66.

A pair of flanges 70 and 72 are each secured to the guide rail 58, each flange extending a distance from the guide rail 58 and the flange 70 being spaced a distance 74 from the flange 72. A forward switch 74 is connected to the flange 70 and a portion 76 of the forward switch 74 is disposed between the flanges 70 and 72 engageable with the guide arm 50 when the slide member 40 is moved a sufficient distance in the brake disengaging direction 22. A reverse switch 78 is connected to the flange 72 and a portion 80 of the reverse switch 78 is disposed between the flanges 70 and 72 engageable with a portion of the guide arm 50 when the slide member 40 is moved a sufficient distance in the brake engaging direction 20. The forward switch 74 is spaced the distance 73 from the reverse switch 78 since the switches 74 and 78 are each secured to the flanges 70 and 72.

The forward switch 74 and the reverse switch 78 are each connected to a control assembly 82, and the vehicle power supply 14 is connected to the control assembly 82 via the vehicle ignition switch 12 interposed therebetween, the control assembly 82 being interposed between the vehicle power supply 14, the forward and reverse switches 74 and 78 and the motor 26.

During the operation of the brake control apparatus 10 when the vehicle ignition switch 12 has been moved to the off (open) position and the slide member 40 moved in the brake engaging direction 20 to a position wherein the guide arm 50 has engaged the reverse switch 78, the motor 26 is positioned in the off position and the vehicle brakes 16 are positioned in the engaged position via the connection between the brake control apparatus 10 and the vehicle brakes 16 via the brake cable 18. When the vehicle ignition switch 12 is placed in the on (closed) position by the vehicle operator, the vehicle power supply 14 is connected to the motor 26 via the control assembly 82 positioning the motor 26 in the actuated reverse condition causing the rod 30 to be rotated in the second direction of rotation 36 moving the tube 42 in the brake disengaging direction 22. The slide member 40 continues to be moved in the brake disengaging direction 22 via the motor 26 until the guide arm 50 of the slide member 40 is moved into engagement with the portion 76 of the forward switch 74. When the guide arm 50 engages the portion 76 of the forward switch 74, the vehicle brakes 16 are in the disengaged position and the engagement between the guide arm 50 and the forward switch 74 causes the control assembly 82 to disconnect the vehicle power supply 14 from the motor 26 positioning the motor 26 in the off position.

When the vehicle ignition switch 12 is placed in the off (open) position by the operator, the vehicle power supply 14 is connected to the motor 26 via the control assembly 82 positioning the motor 26 in the actuated forward condition causing the rod 30 to be rotated in the first direction of rotation 34 moving the tube 42 in the brake engaging direction 20. The slide member 40 continues to be moved in the brake engaging direction 20 via the motor 26 until the guide arm 50 of the slide member 40 is moved into engagement with the portion 80 of the reverse switch 78. When the guide arm 50 engages the portion 80 of the reverse switch 78, the vehicle brakes 16 are in the engaged position and the engagement between the guide arm 50 and the reverse switch 78 causes the control assembly 82 to disconnect the vehicle power supply 14 from the motor 26 positioning the motor 26 in the off condition.

As shown in FIG. 1 and as shown schematically in more detail in FIG. 2, the control assembly 82 includes a relay 84, a ground control switch 86 and a dash light relay 88. The control assembly 82 also includes a dash light 90 and a manual override switch 92, the manual override switch 92 being interposed in the control assembly 82 for engaging the vehicle brakes 16 without turning the vehicle ignition switch to the off position which may be desirable in some operational uses of the brake control apparatus 10. It should be noted that, in one sense, the forward and the reverse switches 74 and 78, the actuating guide arm 50, the motor 26, the vehicle ignition switch 12 and the vehicle power supply 14 are also part of the control assembly 82, all of the components and assemblies cooperating to automatically engage and disengage the vehicle brakes 16.

The relay 84 has four normally open contacts (open in a de-energized condition of the associated relay coil), two pair of power contacts 94 connected in parallel and each connected to the armature of the motor 26, a pair of forward contacts 96 connected to the forward field of the motor 26, and a pair of reverse contacts 98 connected to the reverse field of the motor 26, and two relay coils, a forward coil 102 and a reverse coil 104. The forward coil 102 is associated with one of the power contacts 94 and the forward contacts 96 to close the power contacts 94 and the forward contacts 96 in an energized position of the forward coil 102 and to open the power contacts 94 and the forward contacts 96 in a deenergized position of the forward coil 102. The reverse coil 104 is associated with the reverse contacts 98 and one of the power contacts 94 to close the reverse contacts 98 and the power contacts 94 in an energized position of the reverse coil 104 and to open the reverse contacts 98 and the power contacts 94 in a de-energized position of the reverse coil 104.

In a preferred form, the motor 26 is a reversible motor constructed for drivingly rotating the output shaft thereof in two directions, as mentioned before. The power contacts 94 are connected to a terminal 105 and are connected via a conductor 106 to a conductor 108 which is connected to the positive side of the vehicle power supply 14 and to the motor 26, the power contacts 94 connecting the positive side of the vehicle power supply 14 to the armature of the motor 26 in a closed position thereof. The forward contacts 96 are connected to the terminal 105 and are connected to the positive side of the vehicle power supply 14 via the conductors 106 and 108 thereby connecting the vehicle power supply 14 to the forward field of the motor 26 in the closed position of the forward contacts 96. The reverse contacts 98 are connected to the terminal 105 and are connected to the positive side of the vehicle power supply 14 via the conductors 106 and 108 thereby connecting the vehicle power supply 14 to the reverse field of the motor 26 in the closed position of the reverse contacts 98. The motor 26 is constructed such that the motor 26 is positioned in the actuated forward condition when the power contacts 94 and the forward contacts 96 are closed and such that the motor 26 is positioned in the actuated reverse condition when the power contacts 94 and the reverse contacts 98 are closed.

One end of the forward coil 102 and one end of the reverse coil 104 are each connected to the terminal 105 connecting each of the coils of the relay 84 to the positive side of the vehicle power supply 14. The forward coil 102 is connected to the forward switch 74 via a conductor 110 and the reverse coil 104 is connected to the reverse switch 78 via a conductor 112. The forward coil 102 is thus energized closing the power contacts 94 and the forward contacts 96 when the forward switch 74 is closed and the conductor 110 is connected to ground via the ground control switch 86. The reverse coil 104 is energized closing the reverse contacts 98 and the power contacts 94 when the reverse switch 78 is closed and the conductor 112 is connected to ground via the ground control switch 86.

As shown in FIG. 2, the forward and the reverse switches 74 and 78 are each normally closed, and each switch 74 and 78 is positioned in the open position upon engagement between the guide arm 50 and the portions 76 and 80 of the forward and the reverse switches 74 and 78, respectively. The forward switch 74 is also connected to the contact 116 of the ground control switch 86, the forward switch 74 being interposed in the conductor 110 between the ground control switch 86 and the relay 84. The reverse switch 78 is also connected to the contact 118 of the ground control switch 86, the reverse switch 78 being interposed in the conductor 112 between the ground control switch 86 and the relay 84.

The ground control switch 84, more particularly, includes a relay coil 120 and a relay arm 122, the relay arm 122 having a contact end 124 and the opposite end thereof being connected to ground. The contact end 124 of the relay arm 122 is positioned in contacting engagement with the contact 118 connecting the conductor 112 to ground in a de-energized position of the ground relay coil 120 and in a closed position of the reverse switch 78. In the energized position of the ground relay coil 120, the ground relay arm 122 is moved to position the contact end 124 in engagement with the contact 116 connnecting the conductor 110 to ground in closed position of the forward switch 74. The ground switch 84 is shown in FIG. 2 in the de-energized position.

The ground relay coil 120 is connected to ground and to the positive side of the vehicle power supply 14 via the conductor 108, the dash light relay 88 being interposed in the conductor 108 between the ground control switch 86 and the vehicle power supply 14. The dash light relay 88 includes a coil 126 and a relay arm 128 having a contact end 130. The coil 126 is connected to ground and to the positive side of the vehicle power supply 14 via a conductor 132, the vehicle ignition switch 12 and the manual override switch 92 are each interposed in series in the conductor 132 between the dash light relay 88 and the vehicle power supply 14. The dash light relay 88 is shown in FIG. 2 in the deenergized position.

In the closed position of the vehicle ignition switch 12 and the manual override switch 92, the coil 126 is energized moving the contact end 130 of the relay arm 128 into contacting engagement with a contact 134 connecting the ground relay coil 120 to the vehicle power supply 14 via conductor 108 and the relay arm 128 interposed therein thereby energizing the ground relay coil 120. If either the vehicle ignition switch 12 or the manual override switch 92 are in the opened position, the vehicle power supply 14 is disconnected from the coil 126, breaking the contacting engagement between the contact 134 and the contact end 130 of the relay arm 128 thereby disconnecting the ground relay coil 120 from the vehicle power supply 14 and de-energizing the ground relay coil 120.

A fuse 137 is interposed in the conductor 108 between the vehicle power supply 14 and the dash light relay 88. The dash light 90 is connected to the vehicle power supply 14 and the contact 118 of the ground control switch 86 via a conductor 136. The dash light 90 is illuminated in a closed position of the vehicle ignition switch 12 when connected to ground via the ground control switch 86 indicating the vehicle brakes 16 are in the engaged position, the dash light 90 being positioned in the non-illuminated or off position in a disengaged position of the vehicle brakes 16. The dash light 90 provides an operator-perceivable indication that the vehicle brakes 16 are in engaged position.

Further, should the fuse 137 break indicating an electrical overload while the control assembly 82 is releasing the vehicle brakes 16, the ground control relay 86 is de-energized illuminating the dash light 90 to indicate a malfunction. If any malfunction occurs which causes the contact 118 to be disconnected from ground, the dash light 90 is illuminated indicating the malfunction.

As shown in FIGS. 1 and 2, the guide arm 50 has been positioned in engagement with and opening the reverse switch 78, the manual override switch 92 is closed and vehicle ignition switch 12 is opened. In this position, the forward contacts 96 are open since the contact 116 of the ground control switch 86 is open, the reverse contacts 98 are open since the reverse switch 78 is open, and the dash light 90 is off since the vehicle ignition switch 12 is open. The vehicle brakes are thus in the engaged position and the vehicle has been rendered non-operative via the opening of the vehicle ignition switch 12. It should be noted that, in this position the dash light relay 88 is in the de-energized position since the vehicle ignition switch 12 is open.

When the operator turns the vehicle ignition switch 12 to the "on" or closed position, the vehicle power supply 14 is connected to the coil 126 via the conductor 132 energizing the coil 126 and closing the relay arm 128 into contacting engagement with the contact 134 thereby connecting the ground relay coil 120 to the vehicle power supply 14 via the conductor 108 and the relay arm 128 interposed therein and energizing the ground relay coil 120. In the energized position of the ground relay coil 120, the ground relay arm 122 is moved to bring the contact end 124 thereof into contacting engagement with the contact 116 thereby connecting the forward coil 102 to ground via the forward switch 76 and the ground control switch 86. When the forward coil 102 is connected to ground, the coil 102 is energized closing the power contacts 94 and the forward contacts 96 thereby connecting the motor 26 to the vehicle power supply 14 via the power contacts 94 and the forward contacts 96 positioning the motor 26 in the forward condition.

In the forward condition of the motor 26, the slide member 40 is drivingly moved in the brake disengaging direction 22 in a manner described before. The slide member 40 continues to move in the brake disengaging direction 22 until the guide arm 50 engages the forward switch 74 opening the forward switch 74. When the forward switch 74 is opened, the forward coil 102 is disconnected from ground thereby disconnecting the motor 26 from the vehicle power supply 14 and positioning the motor 26 in the off position. The vehicle brakes 16 are thus automatically positioned in the engaged position upon the closing of the vehicle ignition switch 12.

After the vehicle brakes 16 have been positioned in the disengaged position, if the vehicle ignition switch 12 is then positioned in the off or open position, the coil 126 is disconnected from the vehicle power supply 14 deenergizing the coil 126 and breaking the contacting engagement between the contact end 130 of the relay arm 128 and the contact 134 thereby disconnecting the ground relay coil 120 from the vehicle power supply 14 and deenergizing the ground relay coil 120. In the de-energized position of the ground relay coil 120, the contact end 124 is moved into contacting engagement with the contact 118 of the ground control switch 86 thereby connecting the reverse coil 104 to ground via the conductor 112 and the reverse switch 78. In this position, the reverse coil 104 is energized closing the power contacts 94 and the reverse contacts 98 connecting the motor 26 to the vehicle power supply 14 via the power contacts 94 and the reverse contacts 98 positioning the motor 26 in the reverse condition.

In the reverse condition of the motor 26, the slide member 40 is drivingly moved in the brake engaging direction 20 in a manner described before. The slide member 40 continues to move in the brake engaging direction 20 until the guide arm 50 engages the reverse switch 76 opening the reverse switch 76. When the reverse switch 76 is opened, the reverse coil 104 are each disconnected from ground thereby disconnecting the motor 26 from the vehicle power supply 14 and positioning the motor 26 in the off condition. The vehicle brakes 16 are thus automatically positioned in the engaged position upon the opening of the vehicle ignition switch 12.

The brake control apparatus 10 thus automatically positions the vehicle brakes 16 in the engaged and disengaged position in response to the positioning of the vehicle ignition switch. The manual override switch 92 is positioned in the control assembly 82 to allow the operator to engage the vehicle brakes 16 in the closed position of the vehicle ignition switch 12, however, the manual override switch 92 cannot be utilized by the operator to disengage the vehicle brakes 16 when the vehicle ignition switch 12 is in the open or off position.

Changes may be made in the construction and the operation of the various parts or elements described herein without departing from the spirit and the scope of the invention as defined in the following claims.

What is claimed is:

1. A brake control apparatus for automatically engaging and disengaging the vehicle brakes in response to the positioning of the vehicle ignition switch in the on and the off positions, respectively, the brake control apparatus comprising:
 a slide member connected to the vehicle brakes, including:
  a tube, having a threaded opening extending a distance therethrough intersecting one end thereof forming an open end, the vehicle brakes being connected to a portion of the tube; and
  a pair of guide arms, one end of each guide arm being connected to the tube and each guide arm extending a distance from the tube;
 means for slidingly supporting the slide member for sliding movement in a brake engaging direction engaging the vehicle brakes and in a brake disengaging direction disengaging the vehicle brakes, including:
  a pair of guide rails, each guide rail being disposed near the tube, the guide rails being disposed on opposite sides of the tube and each guide rail having an elongated guide slot extending therethrough, the end of each of the guide arms, opposite the ends connected to the tube, being slidingly disposed through the guide slot of one of the guide rails, the guide rails slidingly supporting the tube for sliding movement in the brake engaging direction and the brake disengaging direction;

forward switch means, actuated by the slide member in the disengaged position of the vehicle brakes, to switch the means moving the slide member from the actuated forward condition to the off condition;

reverse switch means, actuated by the slide member in the engaged position of the vehicle brakes, to switch the means moving the slide member from the actuated reverse condition to the off condition;

a power supply connectable to the means moving the slide member; and, means connected to the ignition switch, the means moving the slide member, the forward switch means, the reverse switch means and power supply, for connecting the power supply to the means moving the slide member and positioning the means moving the slide member in the actuated forward condition in the closed position of the vehicle ignition switch, and connecting the power supply to the means moving the slide member and positioning the means moving the slide member in the actuated reverse condition in the off position of the vehicle ignition switch.

2. The apparatus of claim 1 wherein one of the pair of guide arms is defined further as being engageable with the forward switch means in one position of the tube for actuating the forward switch means to switch the means moving the slide member from the actuated forward condition to the off condition and engageable with the reverse switch means in one other position of the tube for actuating the reverse switch means to switch the means moving the slide member from the actuated reverse condition to the off condition.

3. The apparatus of claim 2 wherein the slide member is defined further to include:

an elongated connector having one end secured to the tube, the connector extending a distance from the tube terminating with a threaded end portion; and an adjusting nut threadedly connected to the threaded end portion at the connector;

vehicle brake cable means having a portion connected to the vehicle brakes and a portion connected to the connector via the adjusting nut, the adjusting nut adjustingly positioning the vehicle brake cable means on the connector.

4. The apparatus of claim 1 wherein the means moving the slide member is defined further to include:

a threaded rod, having one end disposed through the open end of the tube and threadedly disposed in a portion of the threaded opening of the tube, the rotation of the threaded rod in a first direction of rotation moving the tube in the brake engaging direction and the rotation of the threaded rod in a second direction of rotation moving the tube in the brake disengaging direction; and a motor connected to the end of the threaded rod, opposite the end of the threaded rod disposed in the threaded opening of the tube, the motor being conditionable in the off condition, the actuated forward condition and the actuated reverse condition, the motor rotating the threaded rod in the first direction of rotation in the actuated forward condition thereof and the motor rotating the threaded rod in the second direction of rotation in the actuated reverse condition thereof.

5. The apparatus of claim 4 wherein the forward switch means and the reverse switch means each have an open and a closed position and each is positioned in the open position via the engagement of the slide member, the forward switch means being spaced a predetermined distance from the reverse switch means, the travel of the slide member between the forward and the reverse means in the brake engaging direction engaging the vehicle brakes prior to the engagement between the slide member and the reverse switch means and the travel of the slide member between the forward and the reverse switch means in the brake disengaging direction disengaging the vehicle brakes prior to the engagement between the slide member and the forward switch means.

6. The apparatus of claim 5 wherein the means connecting the power supply to the means moving the slide member is defined further to include:

power contacts connected to the armature of the motor and to the power supply, having an open and a closed position, connecting the power supply to the armature of the motor in the closed position;

a pair of forward contacts connected to the forward field of the motor and to the power supply, having an open and a closed position, the motor being positioned in the forward condition in a closed position of the power contacts and in a closed position of the forward contacts;

a pair of reverse contacts connected to the reverse field of the motor and to the power supply, having an open and a closed position, the motor being positioned in the reverse condition in a closed position of the power contacts and in a closed position of the reverse contacts;

a forward coil, having an energized position and a de-energized position, connected to the power supply and connectable to ground, the forward coil positioning the forward contacts and the power contacts in the closed position in an energized position of the forward coil connected to ground;

a reverse coil, having an energized position and a de-energized position, connected to the power supply and connectable to ground, the reverse coil positioning the reverse contacts and the power contacts in the closed position in an energized position of the reverse coil connected to ground; and a ground control switch connected to the vehicle power supply via the vehicle ignition switch, having a ground connection, an energized position and a de-energized position, the ground connection being connected to the forward coil via the forward switch means in the closed position of the vehicle ignition switch positioning the ground control switch in the energized position, and the ground connection being connected to the reverse coil via the reverse switch means in the open position of the vehicle ignition switch positioning the ground control switch in the de-energized position.

7. The apparatus of claim 6 defined further to include:

a dash light relay, having an energized position, a de-energized position, and a portion interposed between the ground control switch and the power supply connecting the ground control switch to the power supply in an energized position of the dash light relay and disconnecting the ground control switch and the power supply in a de-energized position of the dash light relay being connected to the power supply via the vehicle ignition switch and the dash light relay being energized in a closed position of the vehicle ignition switch and de-energized in an open position of the vehicle ignition switch.

8. The apparatus of claim 6 defined further to include:

a manual override switch, having an opened and a closed position, interposed between the vehicle ignition switch and the ground control relay and connected in series with the vehicle ignition switch.

9. The apparatus of claim 6 defined further to include:

a dash light connected to the vehicle ignition switch and the ground control relay, the dash light being illuminated in the closed position of the vehicle ignition switch when connected to ground via the ground control relay for indicating the positioning of the vehicle brakes in the engaged position.

* * * * *